July 5, 1932.  A. G. COGSWELL  1,866,452
APPARATUS FOR FOLDING PAPER, INSERTING IT IN ENVELOPES, TUCKING IN
THE FLAP OR SEALING THE ENVELOPES, AND STAMPING THEM
Filed July 21, 1928   15 Sheets-Sheet 1
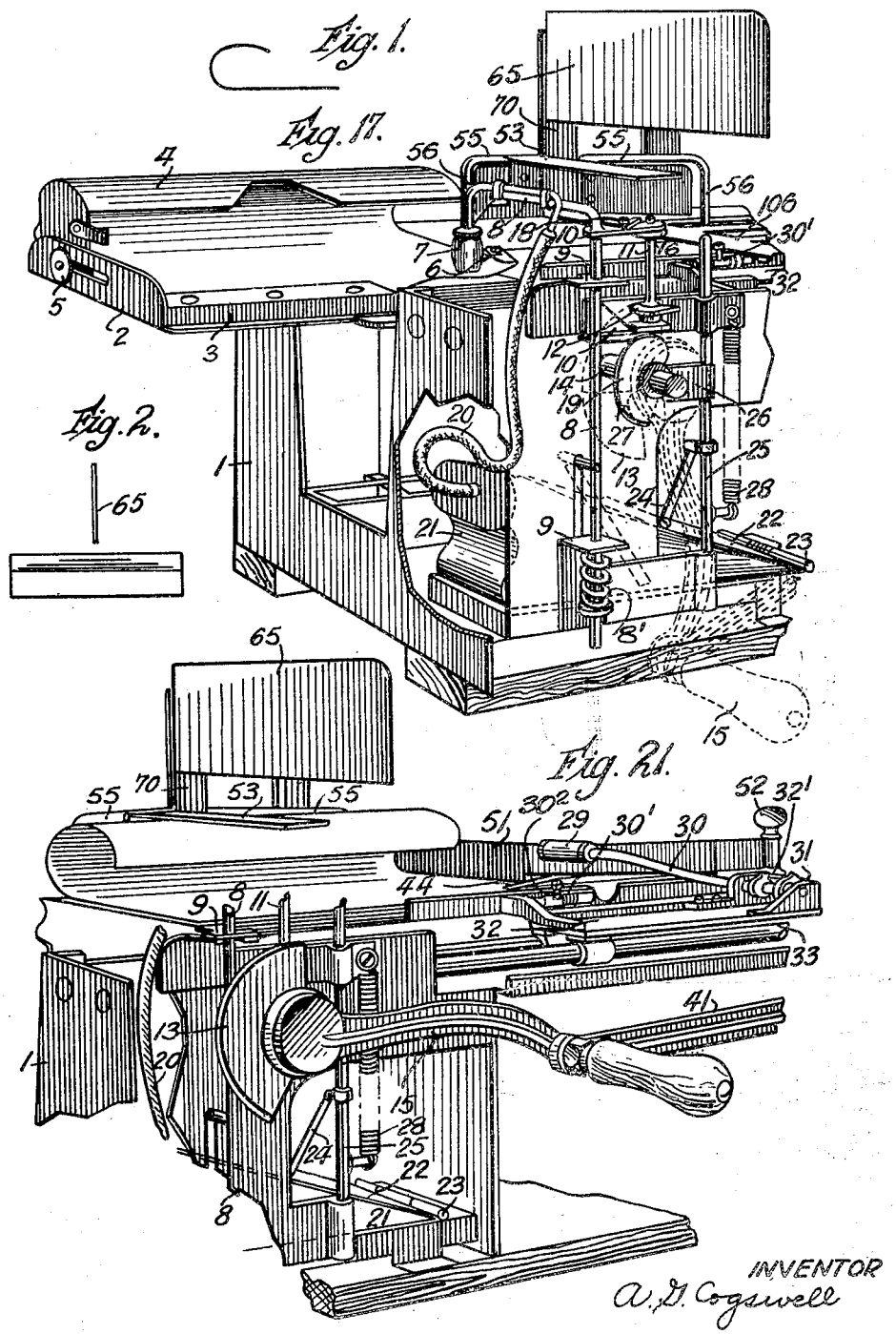

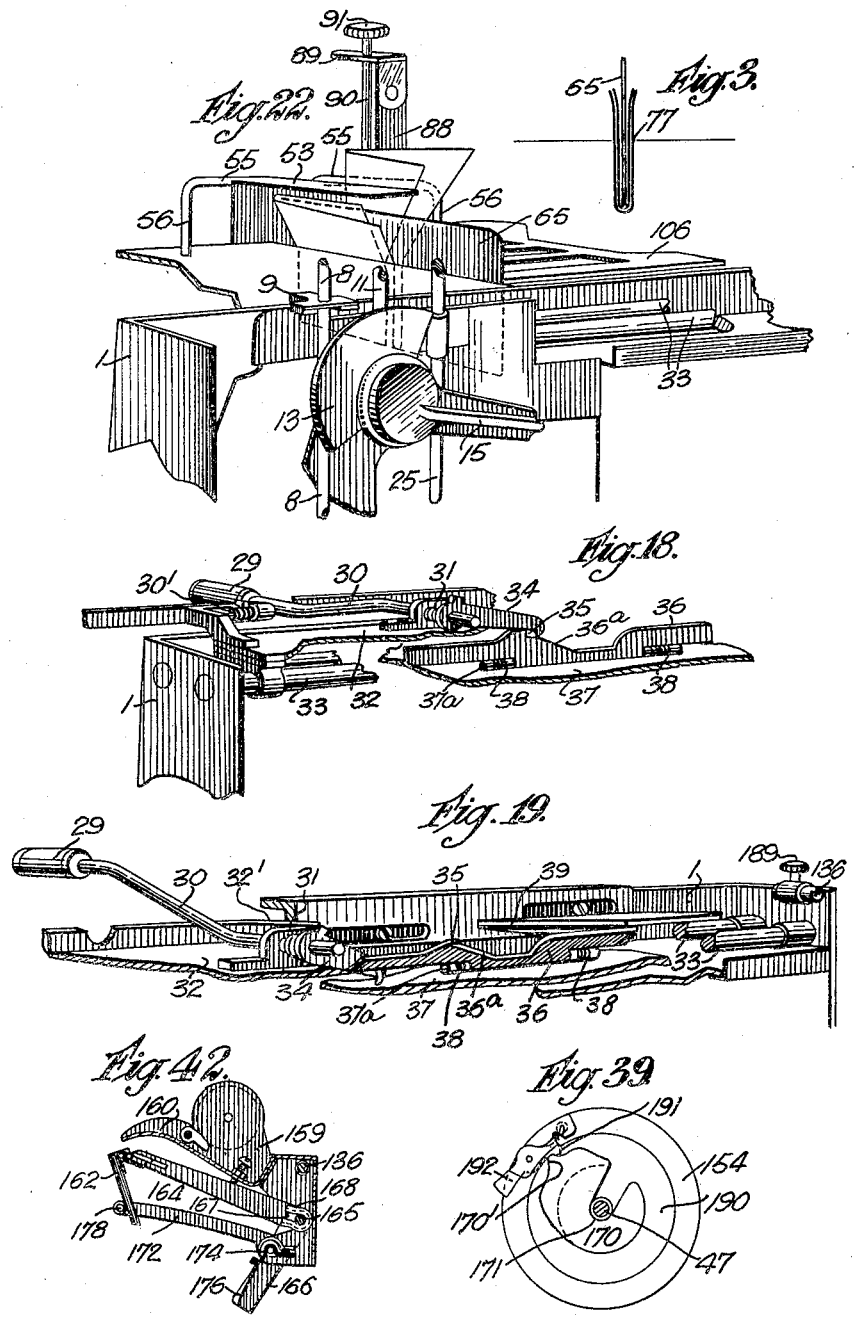

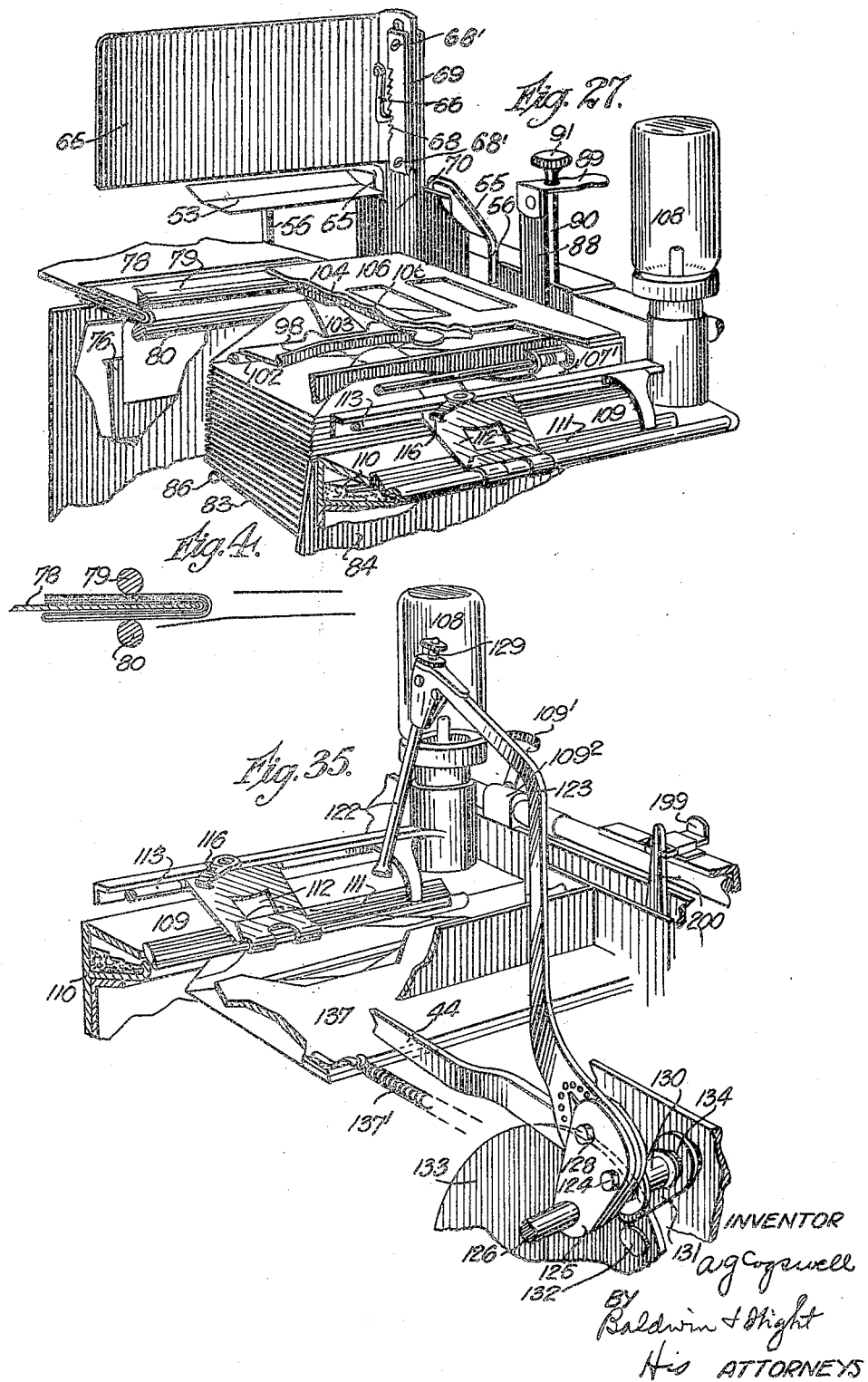

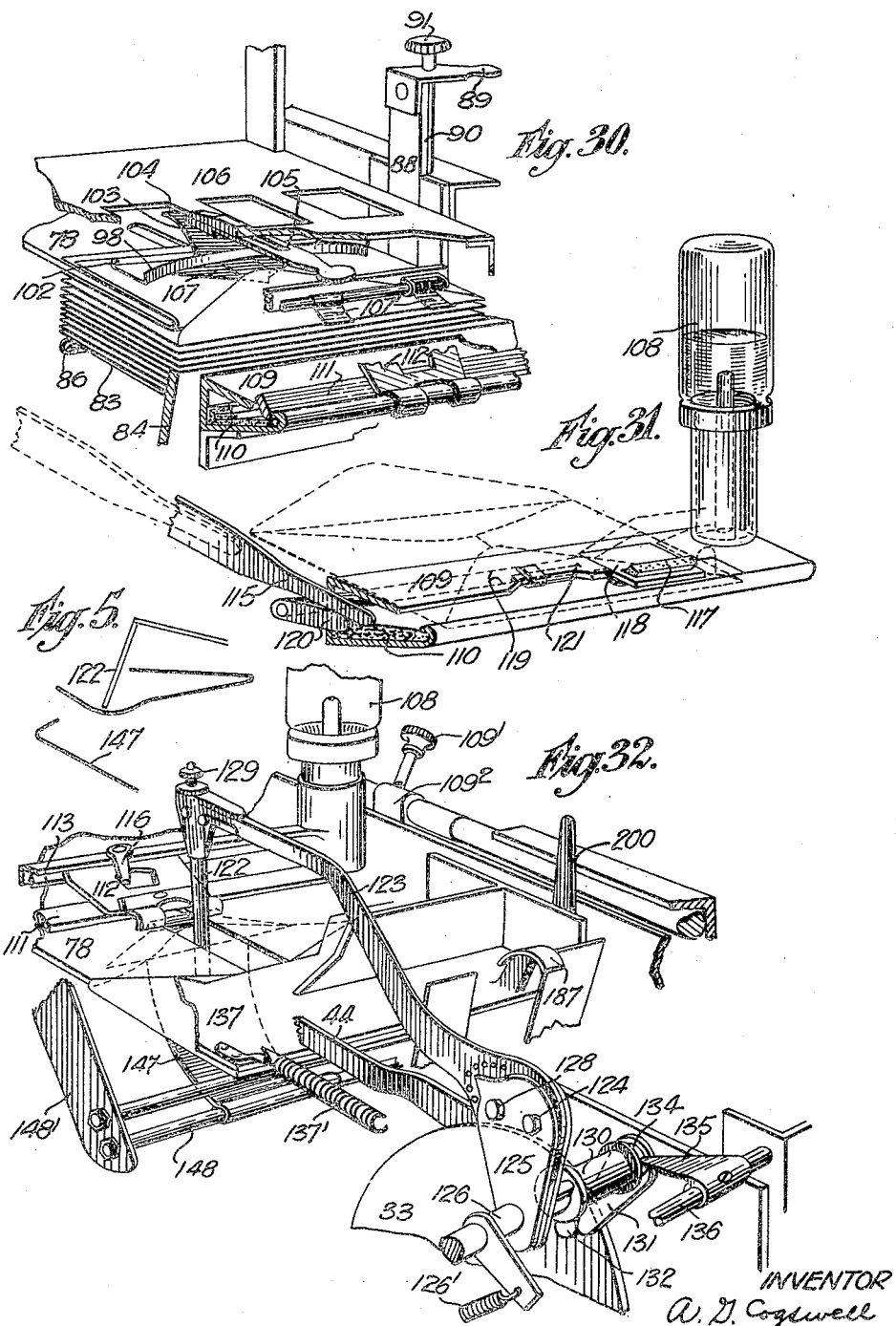

July 5, 1932. A. G. COGSWELL 1,866,452
APPARATUS FOR FOLDING PAPER, INSERTING IT IN ENVELOPES, TUCKING IN
THE FLAP OR SEALING THE ENVELOPES, AND STAMPING THEM
Filed July 21, 1928 15 Sheets-Sheet 5
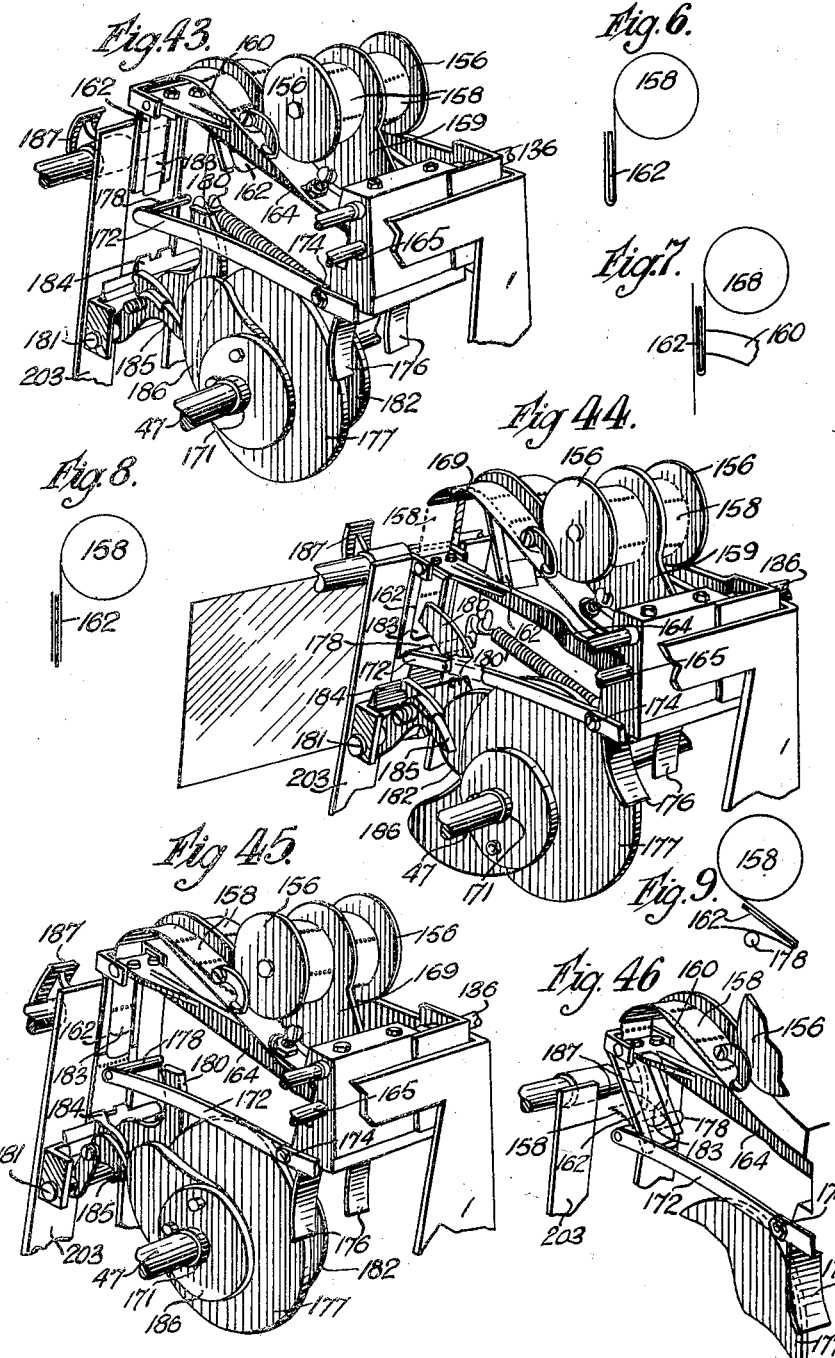

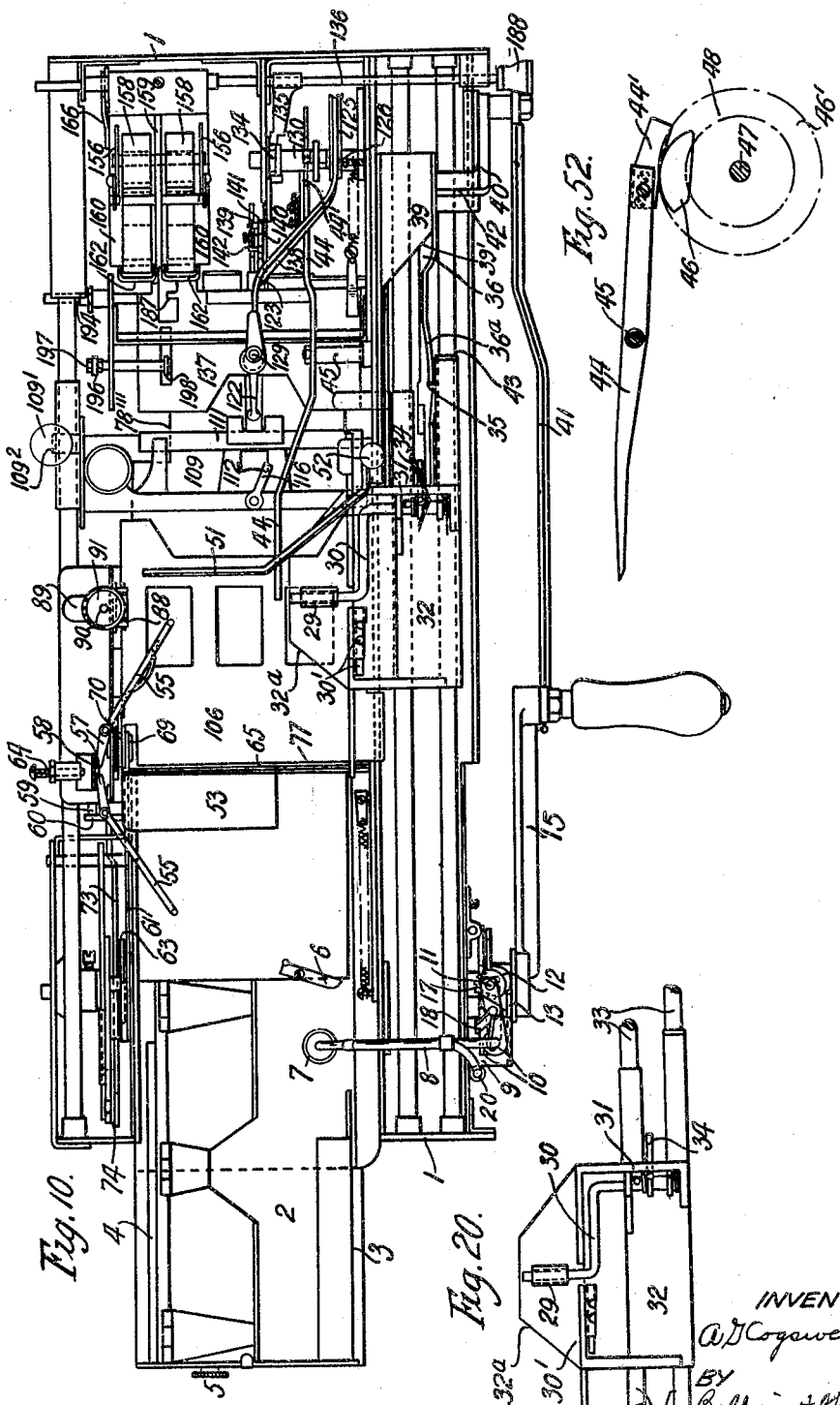

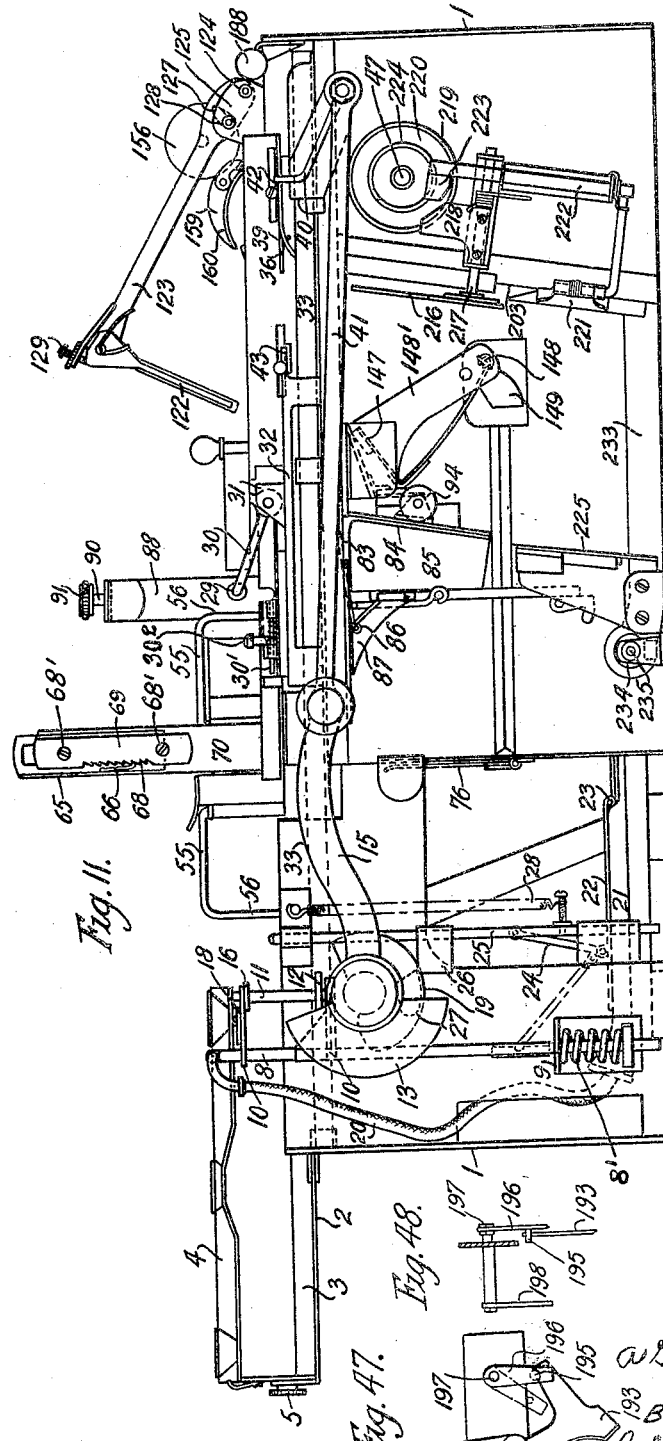
July 5, 1932. A. G. COGSWELL 1,866,452
APPARATUS FOR FOLDING PAPER, INSERTING IT IN ENVELOPES, TUCKING IN
THE FLAP OR SEALING THE ENVELOPES, AND STAMPING THEM
Filed July 21, 1928   15 Sheets-Sheet 7

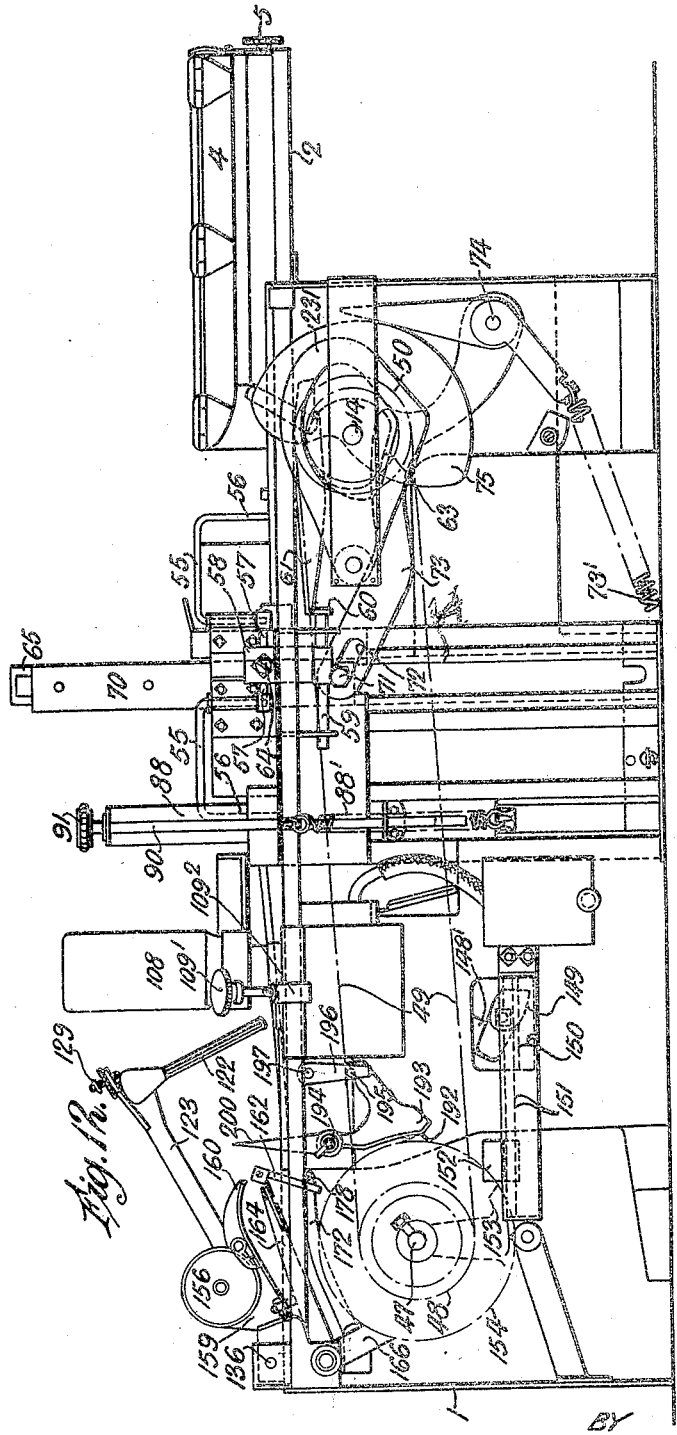

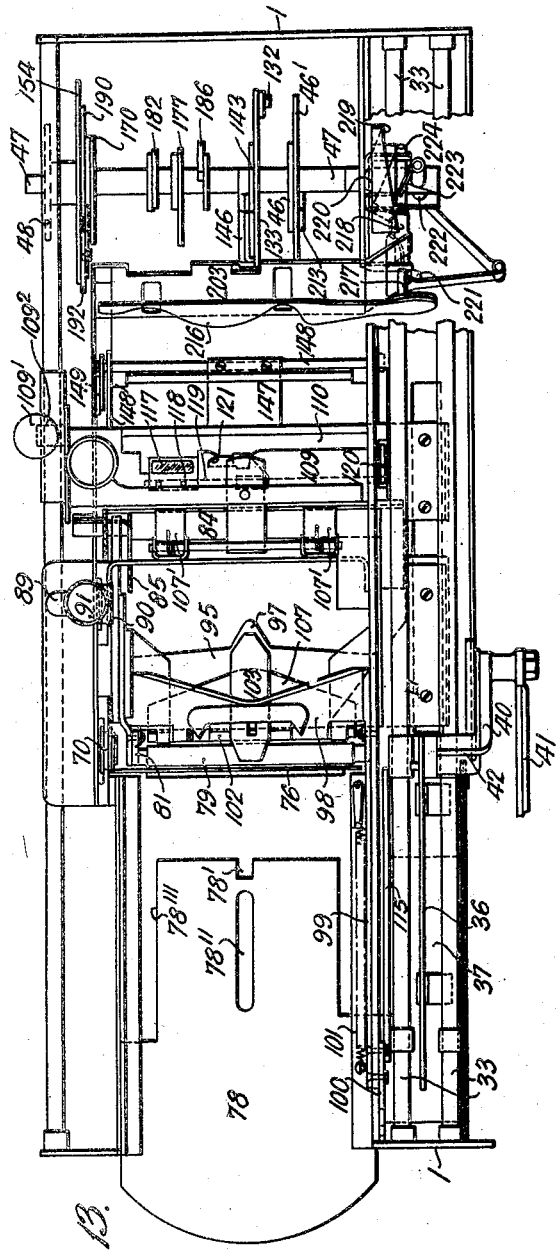

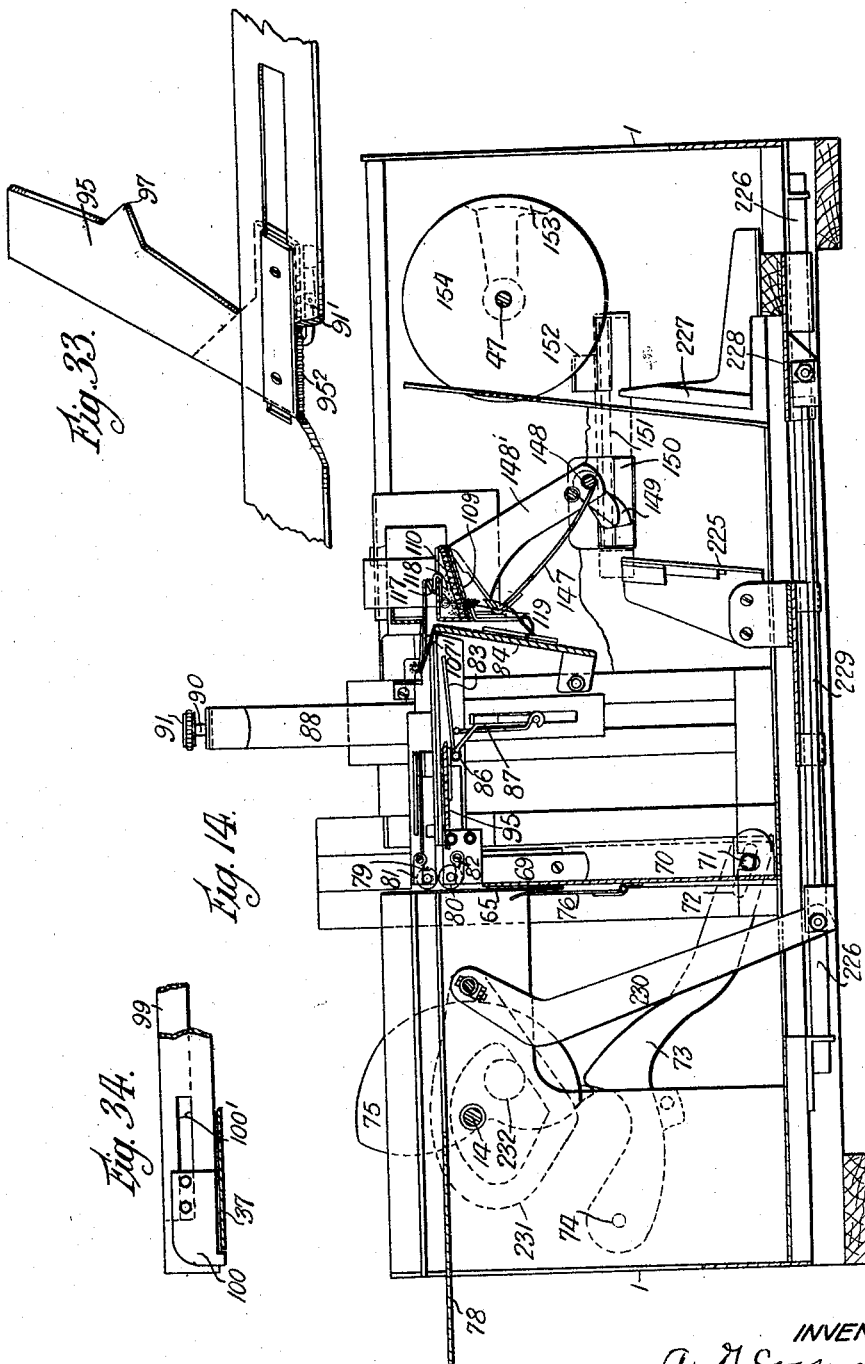

July 5, 1932. A. G. COGSWELL 1,866,452
APPARATUS FOR FOLDING PAPER, INSERTING IT IN ENVELOPES, TUCKING IN
THE FLAP OR SEALING THE ENVELOPES, AND STAMPING THEM
Filed July 21, 1928 15 Sheets-Sheet 11

INVENTOR
A. G. Cogswell
BY
Baldwin & Wight
His ATTORNEYS

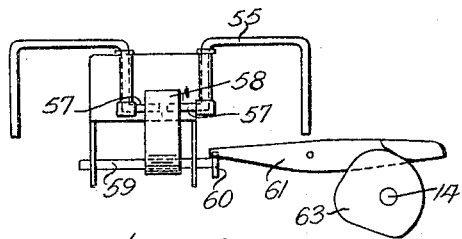
Fig. 23.
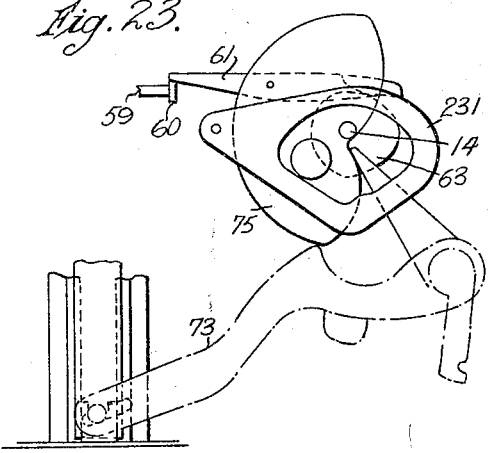
Fig. 53. Fig. 54.
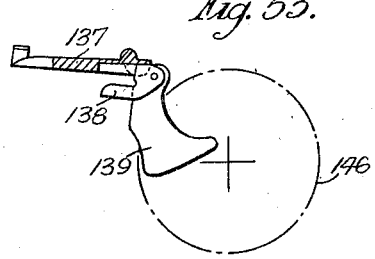 

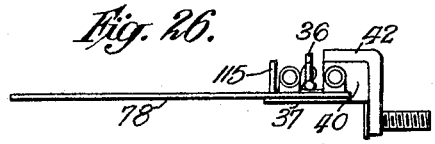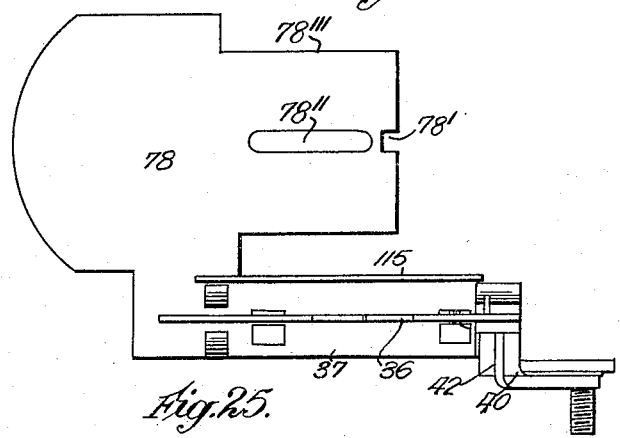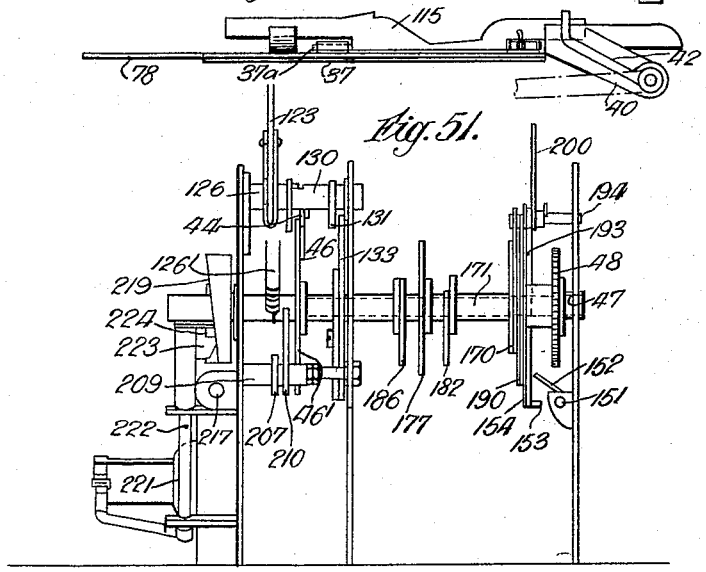

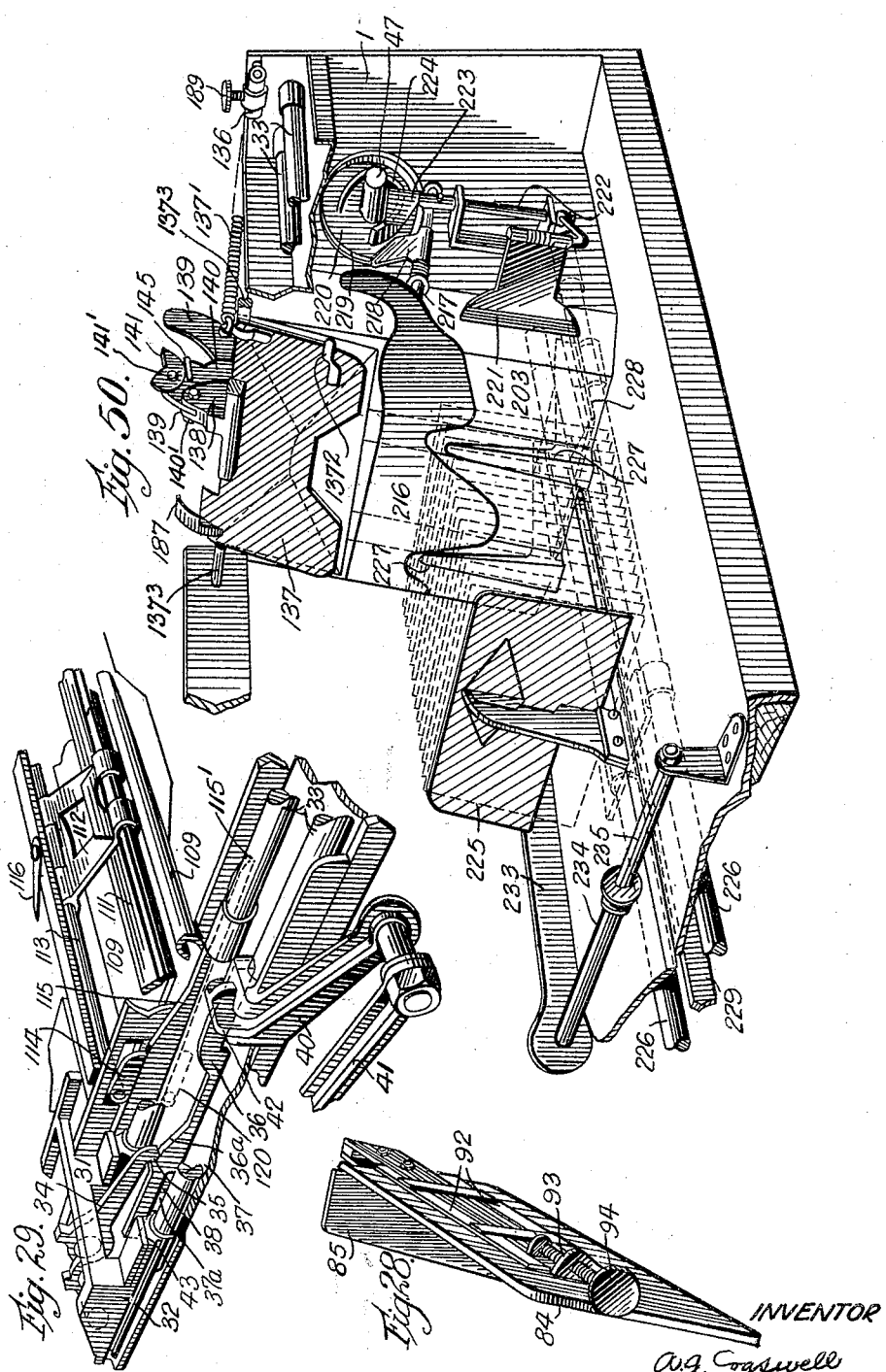

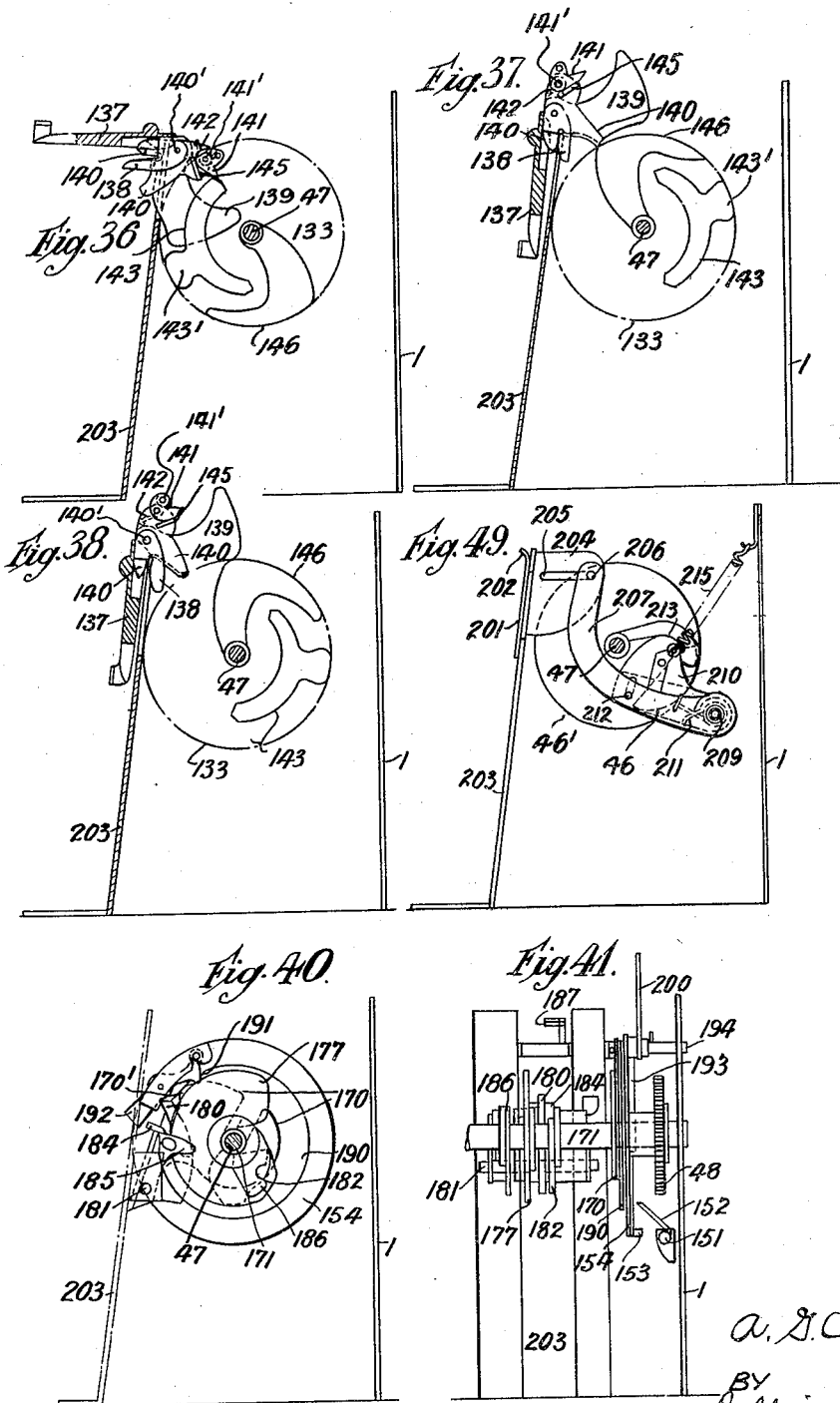

Patented July 5, 1932

1,866,452

UNITED STATES PATENT OFFICE

ALEXANDER GORDON COGSWELL, OF CHIPPING SODBURY, ENGLAND

APPARATUS FOR FOLDING PAPER, INSERTING IT IN ENVELOPES, TUCKING IN THE FLAP OR SEALING THE ENVELOPES, AND STAMPING THEM

Application filed July 21, 1928, Serial No. 294,495, and in Great Britain August 3, 1927.

The main object of the present invention is to provide a machine by which a sheet of paper can be folded and inserted into an envelope, which latter is then either sealed or may have the flap thereof tucked in, as may be desired, and means for stamping the envelope if desired.

In the case of private letters, the machine is also capable of tucking a letter under the flap of its respective envelope.

The machine is so arranged that the various operations can be employed either independently or in combination, as may be desired.

The invention is illustrated in the accompanying drawings, in which is shown apparatus incorporating devices described and claimed in my co-pending applications No. 394,274 and No. 394,275.

In the drawings, Figures 1 to 9 are diagrammatic views showing the various operations effected by the machine; Figures 10–15 are views of the complete machine, Figure 10 being a plan, Figure 11 a front elevation, Figure 12 a rear elevation, Figure 13 a plan with certain parts removed, Figure 14 a sectional elevation and Figure 15 a sectional end elevation; Figure 16 is a detail sectional elevation of the pneumatic sheet gripping device and Figure 17 a perspective view thereof and of the paper magazine; Figures 18 and 19 are detail perspective views of the sheet gripping mechanism, and Figure 20 is a plan of the paper carrier and mechanism for the operation thereof; Figure 21 is a perspective view illustrating the mechanism which completes the first fold; Figure 22 is a perspective view of the mechanism for forming the second fold; Figure 23 is a detail rear elevation of cam mechanism for actuating the folding mechanism shown in Figure 22; Figure 24 is a plan of the horizontal folding plate; Figures 25 and 26 are respectively a side and end elevation of Figure 24; Figure 27 is a perspective view showing the various parts comprising the folding mechanism in the position they will occupy at completion of the sheet folding operation, the envelope magazine and the mechanism for moistening the flap of the envelope; Figure 28 is a detail perspective view of a fixed and an adjustable plate of an envelope magazine; Figure 29 is a detail perspective view of an envelope moistening pad and associated parts; Figure 30 is a detail perspective view of the envelope filling mechanism and shows an alternative method of placing the folded sheet under the flap of the envelope; Figure 31 is a detail perspective view of the mechanism for moistening the envelope preparatory to receiving the stamp; Figure 32 is a perspective view of mechanism by means of which the body of the envelope is opened, whereby the flap may be tucked therein and Figure 33 is a detail perspective view of a plate engageable with the envelope for facilitating the insertion of envelope opening means therein, and Figure 34 is a detail side elevation of certain driving connections in the envelope filling mechanism; Figure 35 is a fragmentary perspective view of mechanism for moistening an envelope flap when it is desired to seal the envelope; Figures 36, 37 and 38 are detail views in elevation of a mechanism for turning the envelope into the position for receiving the stamp; Figure 39 is an elevation of the drive for the cams operating the stamping mechanism, and Figures 40 and 41 are respectively side and end elevations of the cams thereof; Figure 42 is a side elevation of the stamping mechanism, and Figures 43, 44, 45 and 46 are perspective views showing the stamping mechanism in different positions. Figures 47, 48 are respectively side and end elevations of details of the stamp controlling mechanism; Figure 49 is a side elevation of the mechanism for delivering the envelope into the receiving magazine; Figure 50 is a perspective view of the envelope receiving magazine; Figure 51 is a detail end elevation. Figure 52 is a detail view and Figures 53, 54 are detail views of the stamping mechanism.

The various operations of the machine will first be described with reference to Figures 1 to 9.

The paper is first caused to assume the shape shown in Figure 1, by the paper magazine, and is then moved below a vertical folding plate, as seen in Figure 2. The said plate is then moved downwardly, thus effecting a second fold, as seen in Figure 3. The sheet thus folded is engaged by a horizontal folding plate which forms a third fold and passes the sheet between folding rollers, as is illustrated in Figure 4; in cases where the paper is to be inserted within an envelope, the horizontal folder plate also carries the sheet into the envelope, as illustrated in Figure 4.

Figure 5 illustrates how the lower face of the envelope is pressed downwardly and the flap tucked into the said envelope.

Figure 6 to 9 illustrate diagrammatically the operations of the stamping mechanism. Figure 6 shows how the stamp is passed under a cutter; Figure 7 shows the stamp being pressed on to the moistened envelope; Figure 8 illustrates how the first stamp is severed from the next adjacent stamp, and Figure 9 how the said next adjacent stamp is turned over the cutter into position for the next sequence of operations.

1 is the frame of the machine upon which is slidably mounted a magazine base 2 having a lip 3, and 4 is the side of the magazine which is curved as is described and claimed in my copending application No. 394,274 and is slidably mounted on the base 2, a locking screw 5 being provided to lock the side 4 in any desired position, and a clip 6 being provided to retain the paper in the magazine.

7 is a rubber sucker which, as is described and claimed in my copending application No. 394,274, is adapted to engage the surface of the top sheet of paper located within the magazine 2, 4, and which is carried by an L-shaped arm 8 urged downwardly by a spring 8' and pivotally and slidably mounted in bearings 9. Rigidly secured to vertical portions of the arm 8 are brackets 10 in which is mounted a rod 11 having secured thereto a cam 12 whose periphery is adapted to be engaged by the face of a cam 13 fast with a main shaft 14 adapted to be rotated by a handle 15. Also secured to the rod 11 is a disc 16 having serrations 17 engaged by a spring-urged pawl 18 which normally prevents rotation of the disc and hence of the rod 11 with respect to the brackets 10, and which is pivotally mounted on the upper of the brackets 10. The lower of the brackets 10 is adapted to be engaged by a cam 19 also fast with the shaft 14. The sucker 7 is in communication, through a flexible pipe 20, with bellows 21, the upper plate 22 of which is pivoted at 23 and to which is pivotally connected one end of a link 24, the other end of which is connected to a slidably mounted rod 25 having a block 26 adapted to be engaged by a lug 27 on the cam 19 a spring 28 being provided tending to open the bellows.

The operation of the parts so far described is as follows:—

The sheets are placed in the magazine 2, 4, which, on account of its shape, causes the paper to be turned over, as seen in Figure 17, and form the commencement of the first fold the forward corner of the sheet being placed below the clip 6.

If it be desired to vary the effective size of the magazine, this can be effected by releasing the locking screw 5 and sliding the side 4 relatively to the base 2, or by sliding the base 2 relatively to the frame 1.

If, now, the handle 15 be rotated, the sucker 7 is lowered into contact with the top sheet by the cam 19, allowing the brackets 10 and hence the arm 8 to move downwardly under the action of the spring 8'. The arm 8, is then rocked by the engagement between the cam 13 and the cam 12, the movement due to which is transmitted to the arm 8 through the brackets 10 carrying the rod 11 and cam 12. The forward corner of the top sheet is thus moved from below the clip 6 and thereafter the lug 27 allows the bellows to be expanded by the spring 28, thus holding the top sheet in contact with the sucker 7 by vacuum. Continued operation of the handle 15 causes the cam 19 to bear against the lower bracket 10 which is lifted and with it the arm 8 and the sucker 7, the top sheet thereby being lifted from the next lower sheet. It will be seen that the angular movement imparted to the sucker by the rocking movement of the arm 8 effects a slight separation of the top sheet from the next sheet, and thus facilitates the raising of only one sheet at a time when the sucker is moved vertically.

The extent to which the arm 8 is rocked can be varied by releasing the pawl 18 from engagement with the notches in the disc 16, rotating the cam 12 so that it lies more or less in the path of the cam 13, and then moving the pawl 18 into re-engagement with the appropriate serration 17 on the disc which locks the disc and hence the rod 11 against rotation with respect to the brackets 10 and arm 8. Obviously the cam 12 may completely be moved out of the path of the cam 13, in which case no movement would be imparted to the sucker in the plane of the sheet.

29 is a gripper carried by an arm 30 spring-urged to its upper position and pivotally mounted in a bracket 31 mounted on a sheet carrier 32 slidably mounted on guides 33 secured to the frame 1. The arm 30 is provided with a lever 34 adapted normally to be engaged by a driving surface 35 on a plate 36 having an inclined surface 36a and pivotally mounted on a pin 37a carried on a plate 37 also slidably mounted on the guides 33. The plate 36 is urged into engagement with the lever 34 by springs 38, coiled around the pin 37a, and is adapted to be moved out of engagement therewith by a fixed plate 39 having an angularly disposed end 39' which rocks the plate 36 against the action of the springs 38. 30' is a slidably mounted spring-urged bolt on the carrier 32 and adapted to be moved so as to lie either clear of or below the arm 30: the bolt is formed with an operating knob 30² which can be moved into either of a pair of slots to retain the bolt in either position.

Fast with the plate 37 is an arm 40 to which is pivotally connected one end of a link 41 the other end of which is pivotally connected to the handle 15.

The arm 40 is also provided with a driving surface 42 adapted to engage a driving block 43 secured to the carrier 32.

44 is a gripper lever pivotally mounted at 45 and having a spring controlled arm 44′ engaged by a cam 46, mounted on a disc 46′, fast with a shaft 47, fast with which is a chain wheel 48 over which passes a chain 49 driven by a chain wheel 50 fast with the main driving shaft 14. 51 is a register against which the top sheet is fed by the carrier and which is slidably mounted and provided with a locking screw 52.

In operation, after the top sheet is picked up by the sucker 7, movement of the handle 15 causes a lateral extension 32a of the carrier 32 to be moved under the said sheet, the drive being transmitted from the surface 42 to the block 43. The handle is now in such a position that further movement causes the plate 37 to move away from the paper magazine, whereby the inclined surface 36a causes the arm 30 to rock whereby the gripper 29 is moved downwardly so as to clamp the top sheet between it and the extension 32a (see Figures 10, 18 and 20).

Thereafter the driving surface 35 moves into engagement with lever 34 and the carrier is slidden with the top sheet. When the sheet comes against the register 51, the plate 36 moves into engagement with the angularly disposed end of the fixed plate 39, the plate 36 is thereby rocked, and the arm 30 thereby released and rocked by its spring, thus releasing the sheet of paper from between the gripper 29 and extension 32a. The sheet is now gripped between the lever 44 and a fixed plate 106 (see Figure 10). Since the lever 34 is now out of driving engagement with the surface 35, the carrier 32 comes to rest.

Further movement of the handle 15 now causes the plate 37 to move in the reverse direction. When the surface 42 engages the block 43, the carrier 32 is returned to its original position. Still further movement of the handle will cause the cycle of operations of the carrier 32 described above to be repeated. That is, the link 41 through the arm 40 will move the plate 37 away from the magazine. During this movement of the plate 37 the driving surface 35 on the plate 36 carried by the plate 37 will engage the arm 34 on the carrier and move the latter in a direction away from the magazine.

If it be desired not to pick up a sheet of paper, the gripper 29 can be rendered inoperative by sliding the bolt 30′ so that it lies below and prevents the arm 30 from completing its downward motion, and hence prevents the gripper 29 from moving into clamping engagement with the top sheet. When it is desired to render the gripper operative, the bolt 30′ is slid to its original position clear of the arm 30.

The commencement of the first fold formed by the curved magazine is maintained, during the movement of the sheet, by a plate 53 secured to the rear of the machine frame 1.

55 are spring urged arms, having downwardly extending portions 56, adapted to engage the sheet of paper, the arms being pivotally mounted in the frame 1. The arms are provided with arms 57, adapted to be engaged by a plate 58 fast with a spindle 59 having an arm 60 engaged by a lever 61 adapted to be actuated by a cam 63 fast on the shaft 14.

The extent of movement of the plate 58 can be controlled by an adjusting bolt 64 which controls the movement of the said plate.

65 is a vertical folder plate having a pawl 66 adapted normally to engage teeth 68 formed on a driving plate 69 fast with a slide 70 having a pin 71 in engagement with a slot 72 formed in a lever 73 pivotally mounted at 74 and urged by a spring 73′ to rock so as to return the plate 65 to its raised position the plate 65 being located between and positioned by the plate 69 and slide 70. The lever 73 is in engagement with a cam 75 fast with the shaft 14. 76 is a spring plate for retaining the sheet of paper in position, and 77 is a slot in the top plate of the machine, through which the plate passes.

In operation when the sheet has been released by the gripper 29, the arms 55 are rocked by the plate 58 and the sheet moved into register with the side 32′ of the carrier 32 (see Figures 19 and 21). The folder blade 65 is then moved downwardly by the cam 75 and lever 73, whereby the sheet is forced through the slot 77 (see Figure 22) into engagement with the spring plate 76; this operation substantially completes the first fold and forms a second fold. By means of the pawl 66 and teeth 68, the initial position of the vertical folder plate can be adjusted vertically to suit the size of envelope into which the folded sheet is to be inserted and clamped in adjusted position by screws 68′.

78 is a horizontal folder plate formed integral with the plate 37, and 79, 80 are folding rollers, urged towards one another by spring-urged arms 81, 82, and between which the plate 78 is adapted to pass.

After the vertical folding plate 65 has been moved upwardly, leaving the sheet retained by the spring plate 76, the horizontal folder plate 78 is moved into engagement with the sheet, carrying it out of the spring plate 76 and between the rollers 79, 80. This operation forms a third fold and completes the first and second fold.

83 is a flap forming together with a fixed plate 84 and an adjustable plate 85 a magazine for containing envelopes. The flap 83 is spring-urged upwardly and is pivotally mounted on a rod 86 carried by a bracket 87 fast with a slide 88 mounted in guides in the machine frame, and having a right angled extension 89, the slide 88 being spring-urged upwardly by a spring 88'. The flap is also connected to a rod 90, slidably mounted in the slide 88 and provided with an actuating knob 91 whereby when the operator presses on the knob 91 to lower the flap 83, the flap is first tilted during the movement of the knob from its normal position to the position in which it engages the top of the slide 88, and when the knob and slide 88 move together, the flap is lowered, the tilting movement preventing envelopes in the magazine from falling therefrom.

The adjustable plate 85 is slidably mounted in guides 92 carried by the fixed plate 84 and having a lug 93 rotatably but not slidably mounted in which is an adjusting screw 94 carried by the fixed plate, as seen in Figure 28.

95 is a plate which is adapted to engage the inner face of the lower portion of the envelope to facilitate the insertion of envelope opening means hereinafter referred to. Said plate is slidably mounted in the frame 1 and provided with a spring-urged detent 91' adapted to engage teeth 95² on the plate 95 for locking said plate in any desired position. The front end of the plate is provided with a projection 97, adapted, when the envelopes are placed as shown in Figure 27, to engage the exposed portion of the inside of the envelopes.

98 is a bridge piece slidably mounted in the machine frame and having fast therewith a rod or bar 99 having at its end a driving block 100 which passes through a slot 100' in the framing of the machine and is adapted to be engaged by the end of the plate 37, the said bridge piece being urged towards the envelope magazine by a spring 101. The bridge piece is provided with a rod 102 upon which is freely mounted a tongue member 103 spring-urged in a downward direction and adopted at one end to extend within the envelope and at the other end to engage a block 104 carried by a slide 105 slidably mounted in a fixed plate 106. Also freely mounted on the rod 102 is a plate 107, spring-urged downwardly towards the envelope. 107' are spring pressed fingers adapted to engage the rear edges of the envelopes in the magazine.

In operation, when it is desired to insert a folded sheet within an envelope, the envelopes are placed in the magazine with their flaps open and directed towards the horizontal folding plate 78, as is shown in Figure 27 the flap 83 being pressed downwardly by depression of the knob 91 to enable the envelopes to be placed in the magazine. The envelopes are pressed upwardly towards the projection 97 by the spring urging the flap 83 and the spring 88'. The body of the uppermost envelope is opened in the following manner:—

The forward motion of the plate 37 allows the spring 101 to move the bridge piece 98 towards the envelope magazine, whereby the tongue member 103 and the plate 107 are caused to enter the envelope. The plate 107 is wider than the plate 78 and serves thereby to prevent this latter from fouling the corners of the envelope as it enters. Shortly after the tongue member has commenced to move into the envelope, it is rocked by its engagement with the block 104, whereby the leading end of said tongue member opens the body of the envelope for the reception of the plate 107 and the folded sheet.

The horizontal folding plate 78 is now moved, together with the sheet carried thereby, within the envelope, the said plate first engaging the bottom of the envelope and thereafter moving it out of the magazine and under the fingers 107'. When the plate 78 is retracted, (the envelope being held, in the manner hereinafter described, by gripper jaws 138, 140), the bridge piece is moved to its original position by the engagement between the driving block 100 and the end of the plate 37.

When it is desired not to insert a sheet within an envelope, but to place a sheet outside the envelope but under the flap, this may be effected by moving the slide 105 to such a position that it rocks the tongue member 103 after this latter has passed under the flap, the envelopes being placed in the magazine with their flaps folded down on to the body and with their mouths directed away from the folding plate 78, see Figure 30.

By means of the mechanism now to be described, it is possible to determine:—

(1) Whether the envelope flap is to be sealed (2) Whether the envelope flap is to be tucked within the body thereof (3) Whether the envelope is to be unaffected throughout its passage through the machine, and the envelope body or the letters inserted between the flap.

(4) Whether the envelopes be wetted to receive stamps.

108 is a water supply vessel of the "bird fountain" type, the water from which is supplied to a trough 109 having an absorbent pad 110, the trough being carried in a bracket having lugs 109² slidably mounted on the machine frame and having a locking screw 109'. 111 is an absorbent pad adapted to moisten the flap and carried by a clip 112 fast with a spindle 113 having at one end an arm 114 adapted to be engaged by the upper edge of a cam plate 115 carried by the plate 37. 116 is a clip which is adapted to engage and retain the clip 112 with the pad 111 up and out of operative position.

117 is an absorbent pad adapted to wet the bottom left hand corner of the envelope to receive a stamp, the pad being carried by a clip 118 fast with a spindle 119 mounted in the frame of the trough 109 and having an arm 120 adapted to be engaged by the lower edge of the cam plate 115, the top plate of the trough 109 being cut away to permit the passage of the pad 117 therethrough. 121 is a sliding finger which can be slidden to project from the edge of the cut away portion of the plate 109 and thus to prevent the absorbent pad 117 from moving through the cut away portion into operative position.

122 is a spring controlled finger pivotally mounted on an arm 123 pivoted at 124 to a plate 125 fast with a shaft 126, the arm 123 having a slot 127 into which extends a locking screw 128 provided on the plate 125. When it is desired to adjust the arm 123, it is necessary merely to release the screw 128, rock the arm 123 to the desired position relatively to the plate 125, and retighten the screw 128. The outer end of the arm 123 is provided with an adjusting screw 129 for limiting the rocking of the finger 122, this adjustment permitting the finger 122 to engage an envelope at the most suitable position. Slidably but not rotatably mounted on the shaft 126 is a sleeve 130 carrying an arm 131 adapted to be engaged by an abutment 132 fast with a disc 133 carried by the shaft 47.

The sleeve 130 is provided with a groove 134 engaged by a finger 135 fast with a rod 136, movement of which controls, in a manner hereinafter described, the denomination of the stamp to be applied to the envelope. 137 is a plate having at each end a pivot rod 137³ pivotally mounted in the side frame members of the machine frame as shown in Figure 50 and is provided with extensions 138, 139, the plate 137 tending to be moved in a clockwise direction by a spring 137' (see Figure 50). 140 is a gripper jaw pivotally mounted on a pivot pin 140' carried by the extensions 138, 139; the gripper 140 is adapted to cooperate with the extension 138 and 141 is a finger pivotally mounted on a pivot pin 141' on the gripper jaw 140, the finger 141 being yieldably connected to the jaw 140 by a spring 142 which tends to rock the finger in a clockwise direction. The finger 141 is adapted to be engaged by a cam surface 143 fast with the disc 133 secured to the shaft 47. 145 is an extension formed on the gripper jaw 140 and also adapted to be engaged by the cam surface 143; 146 is a second cam surface which is adapted directly to engage the gripper jaw 140, and to be engaged by the extension 139.

147 is a flap tucker fast with a shaft 148, having an arm 149 engaged by a striking plate 150 secured to a shaft 151 having a second plate 152 adapted to be engaged by a projection 153 formed on disc 154 fast with the shaft 47. The shaft 148 is carried by brackets 148', fast with the underside of the water trough 109, whereby adjustment of the water trough also adjusts the tucker.

In operation, assuming that it be desired to seal and stamp the envelope, this latter, as it is moved by the horizontal folder plate 78, is engaged and wetted by the pad 117; when that portion of the envelope which receives the stamp has passed the pad 117, this latter is moved out of contact with the envelope by the engagement between the cam plate 115 and the arm 120. At the end of the forward motion of the horizontal folder plate, the envelope is between the gripper jaws 138, 140, the plate being cut away at 78' to allow this. At this moment the cam surface 143 engages the finger 141, which latter is compelled to rock, and hence through the spring 142 the jaw 140 is closed on to the envelope which is thus clamped between the jaw 140 and the extension 138. The plate 78 is now retracted, and further movement of the shaft 47 causes the cam surface 143', through its engagement with the extension 145 to rock the plate 137 in an anti-clockwise direction, whereby the envelope is moved from a horizontal to a substantially vertical position the envelope still being held by the grippers 138, 140. During this movement, the flap of the envelope is drawn under the pad 111 and the spindle 113, whereby the gum is moistened and the flap turned towards the body of the envelope, the pad being allowed to move into operative position by the rearward movement of the plate 78, allowing the cam plate 115 to release the arm 114, and hence the pad 111. The plate 137 is retained in this position by the engagement of the extension 139 with the cam surface 146. During this operation the finger 122 is inoperative. It will be observed that the pad 111 is supported by the spindle 113 in such manner that the spindle and pad bridge over the envelopes. Thus, when the pad is freed from the clip 116, the pad will (under the control of the cam plate 115) be in the path of the envelope and the gummed flap thereof will be wetted by the pad.

If, however, it be desired not to seal the envelope, but to fold the flap within the body of the envelope, the pad 111 is held up out of operative position by the clip 116 and the finger 122 rendered operative.

As before, the envelope is fed by the plate 78 into and gripped by the jaw 140 and extension 138. At this moment the pin 132 engages and rocks the arm 131, which, through the shaft 126, causes the finger 122 to be moved downwardly into engagement with the exposed inner portion of the envelope body and opens the mouth thereof, the plate 78 being slotted at 78″ to permit this. After this operation has been effected, the pin 132 moves clear of the arm 131 and the spring 126′ rocks the shaft 126 to return the finger 122 to its original position (see Figure 32). The tucker 147 is now rocked in a clockwise direction by the projection 153 which engages the plate 152 and rocks the shaft 151 which in turn causes the plate 150 fast therewith to engage and move the arm 149 fast with the tucker shaft 148. The flap of the envelope is engaged by the tucker and tucked by the movement thereof within the mouth of the envelope which has, as has been described, been opened by the finger 122.

If it be desired not to stamp the envelope, the pad 117 is moved by hand out of operative position, and retained by the clip 121.

It will be seen that the horizontal plate 78 serves not only to feed and fold the paper but also to support the envelope in its movement from the magazine to the grippers, and while the flap is being tucked in the body of the envelope.

The plate 137 is provided with an extension 137² which is adapted to be engaged by a beak 115′ on the extension 115 to prevent the moving down of the plate 137 until the jaws 139, 140 have properly been closed on to the envelope.

The mechanism for effecting the stamping operation is as follows:—

156 are bobbins for holding rolls 158 of stamps of different denomination, which are rotatably mounted in a frame 159 having guides 160. 162 are hollow guides pivotally mounted on arms 164 freely mounted on a spindle 165 fast with a lever 166 and spring urged in a clockwise direction as seen in Figures 43–46. The spindle 165 is provided with a projection 167 adapted to engage socket members 168, formed on the arms 164. The lever 166 is adapted to be engaged by a cam 170 fast on a sleeve 171 loosely mounted on the shaft 47. 172 are arms pivotally mounted at 174 and formed with arms 176 adapted to be engaged by a cam 177 also formed on the sleeve 171, the arms 172 having pins 178 adapted to engage the leading ends of the stamp rolls, 180 is a presser foot freely mounted on a spindle 181 and spring-urged towards its inoperative position. Pivoted on the presser foot 180 is a lever 180′ spring-urged in a clockwise direction and adapted to be engaged by a cam 182 fast on the sleeve 171 and to permit of the engagement of the foot 180 with the stamp, the guide 162 is slotted at 183.

184 is a stamp grip freely mounted on the spindle 181 and pivotally mounted on the grip is a trip lever 185, spring-urged in a clockwise direction, as seen in Figures 43, 44 and 45, and adapted to be engaged by a cam 186. Fast with the plate 137 is a projection 187 adapted to engage one or other of the stamp guides 162 and to rock them about their pivots. The frame 159 is slidably mounted on the spindle 165 and is fast with the rod 136 having a handle 188 and locking screw 189.

190 is a disc fast with the sleeve 171 and having a notch 191 adapted to be engaged by a spring-urged pawl 192 pivotally mounted on the disc 154 fast with the shaft 47. The free end of the pawl 192 projects beyond the disc 154 and is adapted to be engaged by an arm 193 pivotally mounted at 194 and adapted to be retained in its operative position by a pin 195 fast on an arm 196 secured to a spindle 197 fast with which is an arm 198 the lower end of which is adapted either to be engaged by an envelope as it passes to the stamping mechanism or to register with a cut away portion 78‴ of the horizontal folding plate 78.

In operation, the leading ends of the stamp rolls 158 are passed over the guides 160 through the hollow guides 162 and the first stamp of such roll folded back in front of the guide 162.

When it is desired to stamp a sealed envelope, the right hand stamping mechanism is employed. In this case the arm 135 so slides the sleeve 130 on the shaft 126 that the arm 131 is moved out of the path of the projection 132 and hence the finger 122 rendered inoperative. In this position, moreover, the projection 167 on the shaft 165 is in engagement with the right hand socket member 168, whereby the arm 164 is placed in driving connection with the said shaft 165, the left hand arm 164 being out of driving connection therewith and the right hand arm 172 in driving relationship with the cam 177, the left hand arm 172 being out of relationship.

Upon rotation of the sleeve 171, the hollow guide 162 is rocked downwardly by the cam 170, and at the end of this movement the presser foot 180 by means of the lever 180′ presses through the slot 183 that stamp which has been turned back into contact with the wetted portion of the envelope, which, at this time, has been moved to the vertical position by the plate 137.

The hollow guide is then given a slight further downward movement by a projection 170′ on the cam 170, whereby the end of the hollow guide 162 acts as a knife and severs that stamp which has been pressed into contact with the envelope from the next stamp on the roll, the stamps being firmly held during this operation by the presser foot 180. The guide is then retracted to the position from which it started at the commencement of this operation.

The gripper 184 is rocked by the cam 186 and moved into engagement with the lower end of said next stamp, and the presser foot 180 moved away from the stamps, whereupon the hollow guide is moved upwardly to its original position, the gripper 184 holding the stamp roll stationary during this movement. The gripper 184 is now moved away from the stamp and the projection 187 moved into engagement with the hollow guide 162 which is thereby rocked to the position shown in Figure 46. The upward movement of the hollow guide has caused the stamp next to that severed to project beyond the lower end of the hollow guide 162, this stamp now being folded back upon the front of the hollow guides by the pin 178 which, at this moment, is rocked by its spring into its normal position.

Before the next downward movement of the hollow guide takes place, the cam 177 moves the arm 172 and pin 178 out of the path of the hollow guide.

If it be desired to stamp an envelope, the flap of which has been tucked in, the locking screw 189 is released and the rod 136 slidden to the right, this moving the left hand socket member 168 into engagement with the projection 167 and placing the left hand arm 172 into driving relationship with the cam 177. This movement of the rod 136 causes the arm 131 to be moved by the arm 135 into the path of the pin 132 on the disc 133, whereby the finger 122 is actuated in the manner already described. The stamping is now effected in the manner already described for the operation already employed for the stamps of different denomination.

If, for any reason, no envelope be picked up by the horizontal folding plate 78, or in cases where it is desired to fold the paper without inserting it into an envelope or between the flap and the body, the stamping mechanism is rendered inoperative in the following manner:—

During the forward movement of the horizontal folding plate 78, the cut away portion 78''' of the said plate allows the arm 198 to remain in the vertical position, whereby the pin 195 retains the arm 193 in the position shown in Figure 12. When the free end of the pawl comes against the said arm 193, the pawl 192 is rocked and thus moved out of engagement with the notch 191 on the disc 190, whereby the sleeve 171 and hence the whole stamping mechanism, ceases to be driven. When an envelope next passes the arm 198, this latter is rocked and the pin 195 moved out of locking engagement with the arm 193, thus allowing the pawl 192 to remain in driving engagement with the disc 190.

The stamping mechanism may, in addition, be rendered inoperative by locking the arm 193 in its pawl disengaging position by means of a slidable plate 199 adapted to engage and retain an extension 200 of the said arm. This may be employed when it is desired to pass an envelope without stamping it.

201 is a plate having a lip 202 adapted to engage the upper edge of the envelope and slidably mounted in one end wall 203 of a receiving magazine; fast with the plate 201 is a right angled extension 204 having a slot 205 into which extends a pin 206 carried by an arm 207 pivotally mounted on a spindle 209. 210 is a second arm between which and the arm 207 is interposed a spring 211 which tends to separate the arms, the movement being limited by a pin and slot connection 212. The arm 210 is adapted to be engaged by a cam 213 formed on the disc 46' fast with the shaft 47, and 215 is a spring which tends to rock the arms 207, 210, in a clockwise direction.

216 is a flat plate fast with a spindle 217 having an arm 218 adapted to be maintained by a spring in engagement with an inclined surface 219 formed on a disc 220 fast with the shaft 47. 221 is an envelope aligning member spring-pressed to move on the wall 203 and fast on a spindle 222 having an arm 223 spring-urged into contact with an inclined surface 224 also formed on the disc 220.

225 is the other end wall of the receiving magazine which is slidably mounted on rods 226 and adapted to be maintained in position by friction. 227 are presser feet fast with a platform 228 slidably mounted on the rods 226 and fast with a bar 229. This bar is pivotally connected at its opposite end to an arm 230 fast with a plate 231 cut away to be engaged by a roller 232 mounted on the cam 75.

In operation, after the stamping operation has been completed, the jaw 140 is released from the envelope gripping position by the cam surface 143, whereafter the plate 201 is moved downwardly by the cam 213, the envelope being engaged and moved by the lip 202. At the same time the plate 216 is moved upwardly by the arm 218, to ensure that the envelope flap is not buckled or otherwise distorted as it passes into the magazine and also to press the moistened flap into or substantially into contact with the body of the envelope. The envelope is now delivered by the plate 201 between the presser feet 227 and either the side 225 or any envelopes which have previously been delivered and aligned by the member 221.

The presser feet 227 are now moved forwardly by actuation of the bar 229, whereby the envelope is pressed against the side 225 or the said previously delivered envelopes, this pressing the flap against the body of the envelope and effecting the sealing. If desired, the side 225 may be moved by hand to compress the envelopes against the end wall 203 of the magazine to ensure the complete sealing of the envelopes, the plate 216 being raised by hand to permit this.

When it is desired to eject the envelopes from the magazine, a bar 233, extending at the rear of the magazine and fast with a sleeve 234, slidably mounted on a rod 235, is moved by hand to engage, and hence eject, the envelope, the side 225 being cut away to permit this.

What I claim is:—

1. The combination of a plate adapted to move a sheet of material into an envelope, means for actuating said plate, and means for tucking in the flap of said envelope, said plate remaining in and forming a support for said envelope during at least a part of the flap-tucking operation.

2. The combination of a plate adapted to fold a sheet of material and adapted to move said sheet into an envelope, means for actuating said plate, and means for tucking in the flap of said envelope, said plate forming a support for said envelope during at least a part of the flap-tucking operation.

3. The combination of a plate adapted to form a fold in a sheet of material, and a second plate movable in a direction at right angles to said first plate and adapted to form an additional fold in said sheet, means for moving said second plate to move said sheet into an envelope, and means for performing an additional and succeeding operation on said envelope while said plate remains in and forms a support for the envelope during said succeeding operation thereon.

4. The combination of a magazine adapted to receive sheets of material and so shaped as to form the commencement of a fold therein, a plate adapted to complete said first fold and to form a second fold, and a second plate movable in a direction at right angles to said first plate and adapted to form a third fold in said sheet, means for moving said second plate to move said sheet into an envelope and means for forming an additional and succeeding operation on said envelope while said plate remains in and forms a support for the envelope during said succeeding operation thereon.

5. The combination of a tongue member for entering the mouth of an envelope, means for actuating said member to open the mouth of the envelope, a plate for feeding a sheet of material into said envelope and remaining therein to form a support therefor during succeeding operation thereon, and a second plate for entering said envelope before said first mentioned plate, said second plate being of greater width than the first mentioned plate.

6. The combination of a tongue member for entering the mouth of an envelope, means for actuating said member to open the mouth of the envelope, a plate for folding a sheet of material and for moving said folded sheet into an envelope, said plate remaining in and forming a support for said envelope during succeeding operation thereon, and a second plate for entering said envelope before said first mentioned plate, said second plate being of greater width than the first mentioned plate.

7. The combination of a tongue member for entering the mouth of an envelope, means for actuating said member to open the mouth of the envelope, a plate for forming a fold in a sheet of material, a second plate movable in a direction at right angles to said first mentioned plate to form an additional fold in said sheet and to move said sheet into the envelope, said second plate remaining in and forming a support for said envelope during succeeding operation thereon, and a third plate for entering said envelope before said second plate, said third plate being of greater width than said second plate.

8. The combination of a tongue member for entering the mouth of an envelope, means for actuating said member to open the mouth of the envelope, a magazine for receiving sheets of material and so shaped as to form the commencement of a fold therein, a plate for completing said fold and for forming a second fold, a second plate movable in a direction at right angles to said first mentioned plate to form a third fold in said sheet and to move said sheet into the envelope, said second plate remaining in and forming a support for said envelope during succeeding operation thereon, and a third plate for entering said envelope before said second plate, said third plate being of greater width than said second plate.

9. The combination of a magazine adapted to receive sheets of material, an envelope magazine, means for withdrawing a sheet of material from said sheet magazine, means for feeding the sheet of material into an envelope in the envelope magazine, means for tucking in the flap of an envelope, independent means for moistening the flap of an envelope and sealing it thereto, stamping mechanism adapted to selectively apply stamps of different denominations to an envelope, means for selectively rendering operative either the envelope-sealing or the flap-tucking means, and means actuated by the selected means for controlling the denomination of the stamps to be applied according to whether the flap tucking means or the flap moistening and sealing means is operative.

10. The combination of a magazine adapted to receive sheets of material, an envelope magazine, means for withdrawing a sheet of material from said sheet magazine, means for folding a sheet of the material, means for feeding the sheet of material into an envelope in the envelope magazine, means for tucking in the flap of an envelope, independent means for moistening the flap of an envelope and sealing it thereto, stamping mechanism adapted to selectively apply stamps of different denominations to an envelope, means for selectively rendering operative either the envelope-sealing or the flap-tucking means, and means actuated by the selecting means for controlling the denomination of the stamps to be applied according to whether the flap tucking means or the flap moistening and sealing means is operative.

11. The combination of a magazine adapted to receive sheets of material, an envelope magazine, means for withdrawing a sheet of material from said sheet magazine, means for feeding the sheet of material into an envelope in the envelope magazine, means for tucking in the flap of an envelope, independent means for moistening the flap of an envelope and sealing it thereto, stamping mechanism adapted to selectively apply stamps of different denominations to an envelope, means for selectively rendering operative either the envelope-sealing or the flap-tucking means, means actuated by the selecting means for controlling the denomination of the stamps to be applied according to whether the flap tucking means or the flap moistening and sealing means is operative, a delivery magazine, and means for delivering said envelopes to said delivery magazine.

12. The combination of a magazine adapted to receive sheets of material, an envelope magazine, means for withdrawing a sheet of material from said sheet magazine, means for folding a sheet of the material, means for feeding the sheet of material into an envelope in the envelope magazine, means for tucking in the flap of an envelope, independent means for moistening the flap of an envelope and sealing it thereto, stamping mechanism adapted to selectively apply stamps of different denominations to an envelope, means for selectively rendering operative either the envelope-sealing or the flap-tucking means, means actuated by the selecting means for controlling the denomination of the stamps to be applied according to whether the flap tucking means or the flap moistening and sealing means is operative, a delivery magazine, and means for delivering said envelopes to said delivery magazine.

13. The combination of means adapted to seal an envelope, means adapted to tuck in the flap of an envelope, a plurality of stamping mechanisms each adapted to apply stamps of different denominations to said envelope, each stamping mechanism comprising a movable cutter, means for automatically turning the end stamp of a roll of stamps over the cutting edge of said cutter, means for moving said cutter to advance the stamps, means for passing the stamps into contact with the previously moistened envelope to be stamped, means operable thereupon for moving the cutter relatively to the stamps to sever the end stamp from the roll, means for holding the stamp next to be used while the cutter is retracted, means for selectively rendering operative either the envelope-sealing or the flap-tucking means, and means actuated by the selecting means for moving one or the other of said stamping mechanisms into operative positions, according to whether the means for sealing the envelope or the means for tucking in the flap thereof is operative.

14. The combination of means adapted to seal an envelope, means adapted to tuck in the flap of an envelope, a plurality of stamping mechanisms each adapted to apply stamps of different denominations to said envelope, each stamping mechanism comprising a movable cutter, means for automatically turning the end stamp of a roll of stamps over the cutting edge of said cutter, means for moving said cutter to advance the stamps, means for passing the stamps into contact with the previously moistened envelope to be stamped, means operable thereupon for moving the cutter relatively to the stamps to sever the end stamp from the roll, means for holding the stamp next to be used while the cutter is retracted, means for selectively rendering operative either the envelope-sealing or the flap-tucking means, means actuated by the selecting means for moving one or the other of said stamping mechanisms into operative positions, according to whether the means for sealing the envelope or the means for tucking in the flap thereof is operative, and means for automatically rendering said stamping mechanisms inoperative except when an envelope passes thereto.

15. The combination of a paper magazine, an envelope magazine, means for withdrawing a sheet of paper from the paper magazine, means for folding the sheet of paper, a plate for feeding the folded sheet to an envelope in the envelope magazine, means for tucking in the flap of said envelope, the plate remaining in and supporting said envelope during at least a part of the flap-tucking operation, independent means for moistening the flap of said envelope and sealing it thereto, and means for selectively rendering operative either the envelope-sealing or the flap-tucking means.

16. The combination of a paper magazine, an envelope magazine, means for withdrawing a sheet of paper from the paper magazine, a plate for folding the sheet of paper and for moving said sheet into an envelope in the envelope magazine, means for tucking in the flap of said envelope, the plate remaining in and supporting said envelope during part of the flap-tucking operation, independent means for moistening the flap of said envelope and sealing it thereto, and means for selectively rendering operative either the envelope-sealing or flap-tucking means.

17. The combination of a paper magazine, an envelope magazine, means for withdrawing a sheet of paper from the paper magazine, means for folding the sheet of paper, a plate for feeding the folded sheet to an envelope in the envelope magazine, means for tucking in the flap of said envelope the plate remaining in and supporting said envelope during at least a part of the flap-tucking operation, independent means for moistening the flap of said envelope and sealing it thereto, a delivery magazine, means for delivering said envelope to said delivery magazine, and means for selectively rendering operative either the envelope-sealing or the flap-tucking means.

18. The combination of a paper magazine, an envelope magazine, means for withdrawing a sheet of paper from the paper magazine, a plate for folding the sheet of paper and for moving said sheet into an envelope in the envelope magazine, means for tucking in the flap of said envelope the plate remaining in and supporting said envelope during at least a part of the flap-tucking operation, independent means for moistening the flap of said envelope and sealing it thereto, a delivery magazine, means for delivering said envelope to said delivery magazine, and means for selectively rendering operative either the envelope-sealing or the flap-tucking means.

19. The combination of a plate adapted to move a sheet of material into an envelope, means for actuating said plate, and means for tucking in the flap of said envelope, said flap tucking means comprising a finger adapted to engage the body of the envelope and open the mouth thereof, and a tucker arm adapted to engage the flap of said envelope and to tuck said flap into said open mouth, said plate remaining in and forming a support for said envelope during at least a part of the flap-tucking operation.

20. The combination of a paper magazine, an envelope magazine, means for withdrawing a sheet of paper from the paper magazine, means for folding the sheet of paper, a plate for feeding the folded sheet to an envelope in the envelope magazine, means for tucking in the flap of said envelope the plate remaining in and supporting said envelope during at least a part of the flap-tucking operation, and independent means for moistening the flap of said envelope and sealing it thereto, and means for selectively rendering operative either the envelope-sealing or the flap-tucking means said flap-tucking means comprising a finger adapted to engage the body of the envelope and open the mouth thereof, and a tucker arm adapted to engage the flap of said envelope and to tuck said flap into said open mouth.

21. The combination of a magazine adapted to receive sheets of material and so shaped as to form the commencement of a fold therein, folding mechanism for completing the fold and for effecting further folding operation on the sheets, a pneumatic sucker adapted to deliver a sheet of material from said magazine to said folding mechanism, an envelope magazine, sheet feeding means for moving a folded sheet of material from said folding mechanism into an envelope in said magazine, and means for tucking in the flap of said envelope, said sheet feeding means remaining in said envelope and forming a support therefor during part of the flap-tucking operation.

22. The combination of a magazine adapted to receive sheets of material and so shaped as to form the commencement of a fold therein, an envelope magazine, a folder plate adapted to complete the fold in said sheet and to form a second fold, a pneumatic sucker adapted to deliver said sheet from the sheet magazine to said folder plate, a second folder plate adapted to form a third fold in said sheet, sheet feeding means for moving said folded sheet into an envelope in said envelope magazine, and means for tucking in the flap of said envelope, said sheet feeding means remaining in said envelope and forming a support therefor during part of the flap-tucking operation.

23. The combination of a magazine adapted to receive sheets of material and so shaped as to form the commencement of a fold therein, folding mechanism for completing the fold and for effecting further folding operation on the sheets, a pneumatic sucker adapted to deliver a sheet of material from said magazine to said folding mechanism, an envelope magazine, means for moving a folded sheet of material from said folding mechanism into an envelope in said magazine, means for tucking in the flap of said envelope, means for sealing the flap of said envelope, and means for selectively bringing either the flap-tucking or flap-sealing means into operation.

24. The combination of a magazine adapted to receive sheets of material and so shaped as to form the commencement of a fold therein, an envelope magazine, a folder plate adapted to complete the fold in said sheet, a pneumatic sucker adapted to deliver said sheet from the sheet magazine to said folder plate, a second folder plate, means for moving said folded sheet into an envelope in said envelope magazine, means for tucking in the flap of said envelope, independent means for sealing the flap of said envelope, and means for selectively rendering operative either the envelope-sealing or the flap-tucking means.

25. The combination of a magazine adapted to receive sheets of material and so shaped as to form the commencement of a fold therein, an envelope magazine, a folder plate adapted to complete the fold in said sheet, a pneumatic sucker adapted to deliver said sheets from the sheet magazine to said folder plate, a second folder plate adapted to move a folded sheet into an envelope in said envelope magazine and means for tucking in the flap of said envelope, said plate remaining in said envelope and forming a support therefor during part of the flap-tucking operation.

26. The combination of a magazine adapted to receive sheets of material and so shaped as to form the commencement of a fold therein, an envelope magazine, a folder plate adapted to complete the fold in said sheet, a pneumatic sucker adapted to deliver said sheet from the sheet magazine to said folder plate, a second folder plate adapted to move a folded sheet into an envelope in said envelope magazine, means for tucking in the flap of said envelope, independent means for sealing the flap of said envelope, and means for selectively rendering operative either the envelope-sealing or the flap-tucking means, said second folder plate forming a support for said envelope during at least a part of the flap tucking operation.

27. The combination of a magazine adapted to receive sheets of material and so shaped as to form the commencement of a fold therein, folding mechanism for completing the fold and for effecting further folding operation on the sheets, a pneumatic sucker adapted to deliver a sheet of material from said magazine to said folding mechanism, an envelope magazine, means for moving a folded sheet of material from said folding mechanism into an envelope in said magazine, means for tucking in the flap of said envelope, independent means for sealing the flap of said envelope, stamping mechanisms each adapted to apply stamps of different denominations to said envelope, means for selectively rendering operative either the envelope-sealing or flap-tucking means, and means actuated by the selecting means for controlling the denomination of the stamps to be applied according to whether the flap tucking or envelope sealing means is operative.

28. The combination of a magazine adapted to receive sheets of material and so shaped as to form the commencement of a fold therein, an envelope magazine, a folder plate adapted to complete the fold in said sheet, a pneumatic sucker adapted to deliver said sheet from the sheet magazine to said folder plate, a second folder plate for moving said folded sheet into an envelope in said envelope magazine, means for tucking in the flap of said envelope, independent means for sealing the flap of said envelope, stamping mechanisms each adapted to apply stamps of different denominations to said envelope, means for selectively rendering operative either the envelope-sealing or flap-tucking means, and means actuated by the selecting means for controlling the denomination of the stamps to be applied according to whether the flap tucking or envelope sealing means is operative.

29. The combination of a magazine adapted to receive sheets of material and so shaped as to form the commencement of a fold therein, an envelope magazine, a folder plate adapted to complete the fold in said sheet, a pneumatic sucker adapted to deliver said sheet from the sheet magazine to said folder plate, a second folder plate adapted to form an additional fold in said sheet, and adapted to move a folded sheet into an envelope in said envelope magazine, means for tucking in the flap of said envelope, independent means for sealing the flap of said envelope, said second folder plate forming a support for said envelope during at least a part of the flap tucking operation, stamping mechanisms each adapted to apply stamps of different denominations to said envelope, means for selectively rendering operative either the envelope-sealing or flap-tucking means, and means actuated by the selecting means for controlling the denomination of the stamps to be applied according to whether the flap tucking or envelope sealing means is operative.

30. The combination of a magazine adapted to receive sheets of material and so shaped as to form the commencement of a fold therein, a folder plate adapted to complete the fold in said sheets, a pneumatic sucker adapted to deliver a sheet of material from said magazine to said folder plate, means for moving said sucker in the plane of the sheet, an envelope magazine, a second folder plate adapted to move a folded sheet into an envelope in said envelope magazine, a finger adapted to engage the body of an envelope and to open the mouth thereof, a tucker plate adapted to move the flap of the envelope into said open mouth, said second folder plate remaining in and forming a support for the envelope during at least a part of said flap-tucking operation, means for moistening the flap of said envelope, means for sealing said flap to said envelope and means for selectively rendering operative either the envelope-sealing or the flap-tucking means.

31. The combination of a magazine adapted to receive sheets of material and so shaped as to form the commencement of a fold therein, a folder plate adapted to complete the fold in said sheets, a pneumatic sucker adapted to deliver a sheet of material from said magazine to said folder plate, means for moving said sucker in the plane of the sheet, an envelope magazine, a second folder plate adapted to move a folded sheet into an envelope in said envelope magazine, a finger adapted to engage the body of an envelope and to open the mouth thereof, a tucker plate adapted to move the flap of the envelope into said open mouth, said second folder plate remaining in and forming a support for the envelope during at least a part of the flap-tucking operation, means for moistening the flap of said envelope, means for sealing said flap to said envelope, stamping mechanisms each adapted to apply stamps of different denominations to said envelope, means for selectively rendering operative either the envelope-sealing or flap-tucking means, and means actuated by the selecting means for controlling the denomination of the stamps to be applied according to whether the flap-tucking or envelope-sealing means is operative.

32. The combination of an envelope magazine, means for tucking in the flap of the envelope, means for sealing the flap of the envelope, a plate which feeds a sheet into an envelope in the magazine and remains in the envelope to feed it to the means for flap tucking or sealing, and means for selectively bringing either the flap-tucking or the flap-sealing means into operation.

33. The combination of an envelope magazine, means for tucking in the flap of an envelope, means for opening the mouth of the envelope to receive the flap, a plate which feeds a sheet to an envelope in the magazine and which remains in the envelope to feed it to the flap tucking means and to support the envelope while the mouth opening means is operative, and means for actuating the plate.

34. The combination of an envelope magazine, means for tucking in the flap of the envelope, means for sealing the flap of the envelope, a plate which folds a sheet, feeds the sheet into an envelope in the magazine and remains in the envelope to feed it to the means for flap-tucking or sealing, and means for selectively bringing the flap-tucking means of the flap-sealing means into operation.

35. The combination of an envelope magazine, means for tucking in the flap of an envelope, means for opening the mouth of the envelope to receive the flap, a plate which folds a sheet, feeds the sheet to an envelope in the magazine and which remains in the envelope to feed it to the flap tucking means and to support the envelope while the mouth opening means is operative, and means for actuating the plate.

36. In apparatus for feeding sheets of material into envelopes, the combination with a plate adapted to engage and move a sheet, of means for supporting an envelope in the path of said plate, and means for moving the plate and the sheet into the envelope, means for effecting a succeeding additional operation on said envelope, and means for retaining the plate in the envelope to form a support for said envelope during said succeeding operation thereon.

37. The combination of a plate arranged to fold and thereafter move a sheet, of means for supporting an envelope in the path of said plate, means for moving the plate and the sheet into the envelope, means for performing a succeeding additional operation on said envelope, and means for retaining the plate in the envelope to form a support for said envelope during said succeeding operation thereon.

38. The combination of a plate, means for actuating the plate for moving a sheet of material into an envelope and for feeding the sheet and envelope from one point to another, and means for effecting an operation on the envelope in addition to and other than the feeding operation while the plate is within the envelope whereby this latter is supported during the said additional operation.

39. The combination of a plate, means for actuating the plate for folding a sheet of material, for moving the folded sheet into an envelope and for feeding the sheet and envelope from one point to another, and means for effecting an operation on the envelope in addition to and other than the feeding operation while the plate is within the envelope whereby this latter is supported during said additional operation.

40. The combination of means for sealing the flap of an envelope, alternative means for tucking in the flap of an envelope, a pair of stamping mechanisms adapted respectively to apply stamps to an envelope of the denomination required for a sealed envelope and an envelope whose flap is tucked in, means for selectively rendering the sealing or the flap tucking means operative, and for automatically rendering operative the corresponding stamping mechanism, the stamping mechanisms each comprising means for supporting a roll of stamps, a movable stamp-severing device, means for turning the end stamp over the device, means for moving the device, a presser for pressing the end stamp on to the article to be stamped, means for actuating the presser during the movement of the device so that during one part of its movement the device advances the stamps and then when the presser is moved into operative position, severs the end stamp, and means for holding the stamps while the device is retracted.

41. The combination of means for sealing the flap of an envelope, alternative means for tucking in the flap of an envelope, a pair of stamping mechanisms adapted respectively to apply stamps to an envelope of the denomination required for a sealed envelope and an envelope whose flap is tucked in, and means for selectively rendering the sealing or the flap tucking means operative, and for automatically rendering operative the corresponding stamping mechanism, the stamping mechanisms each comprising means for supporting a roll of stamps, a hollow stamp feeding and severing device through which the stamps are threaded, means for effecting an alternating movement of the device, means for turning the end stamp over the device, a presser for pressing on to the second stamp and through a slot in the device on to the turned over stamp to press this latter on to the article to be stamped, means for moving the presser into engagement with the stamps during the movement in one direction of the device so that this latter in its continued movement severs the turned over stamp, and means for holding the second stamp while the device is retracted.

In testimony that I claim the foregoing as my invention, I have signed my name this ninth day of July, 1928.

ALEXANDER GORDON COGSWELL.